United States Patent [19]

Stamate

[11] 4,069,900
[45] Jan. 24, 1978

[54] COMBINATION TRANSMISSION NEUTRALIZER AND POWER TRAIN INTERLOCK SYSTEM

[75] Inventor: Robert L. Stamate, Edelstein, Ill.

[73] Assignee: Caterpillar Tractor Co., Peoria, Ill.

[21] Appl. No.: 704,132

[22] Filed: July 12, 1976

[51] Int. Cl.² .................. F16H 57/10; B60K 28/00; B60K 41/26
[52] U.S. Cl. ................. 192/4 A; 180/82 A; 180/111; 188/31
[58] Field of Search .......... 192/4 A; 180/82 A, 82 B, 180/111, 112; 188/31, 69

[56] References Cited

U.S. PATENT DOCUMENTS

| | | | |
|---|---|---|---|
| 2,100,970 | 11/1937 | MacMullen | 180/111 X |
| 2,633,777 | 4/1953 | Hoern | 188/69 |
| 3,523,588 | 8/1970 | Bradshaw | 180/112 |
| 3,621,956 | 11/1971 | Suckow | 192/4 A |
| 3,811,020 | 5/1974 | Johnson et al. | 180/82 A X |

Primary Examiner—Allan D. Herrmann
Attorney, Agent, or Firm—Charles E. Lanchantin, Jr.

[57] ABSTRACT

A combination transmission neutralizer and power train interlock system is disclosed which is operatively associated with a vehicle power train and transmission gear shift lever, and which includes an actuator mechanism having a single operable position for simultaneously engaging the interlock with the power train and moving and retaining the gear shift lever in its neutral position.

1 Claim, 4 Drawing Figures

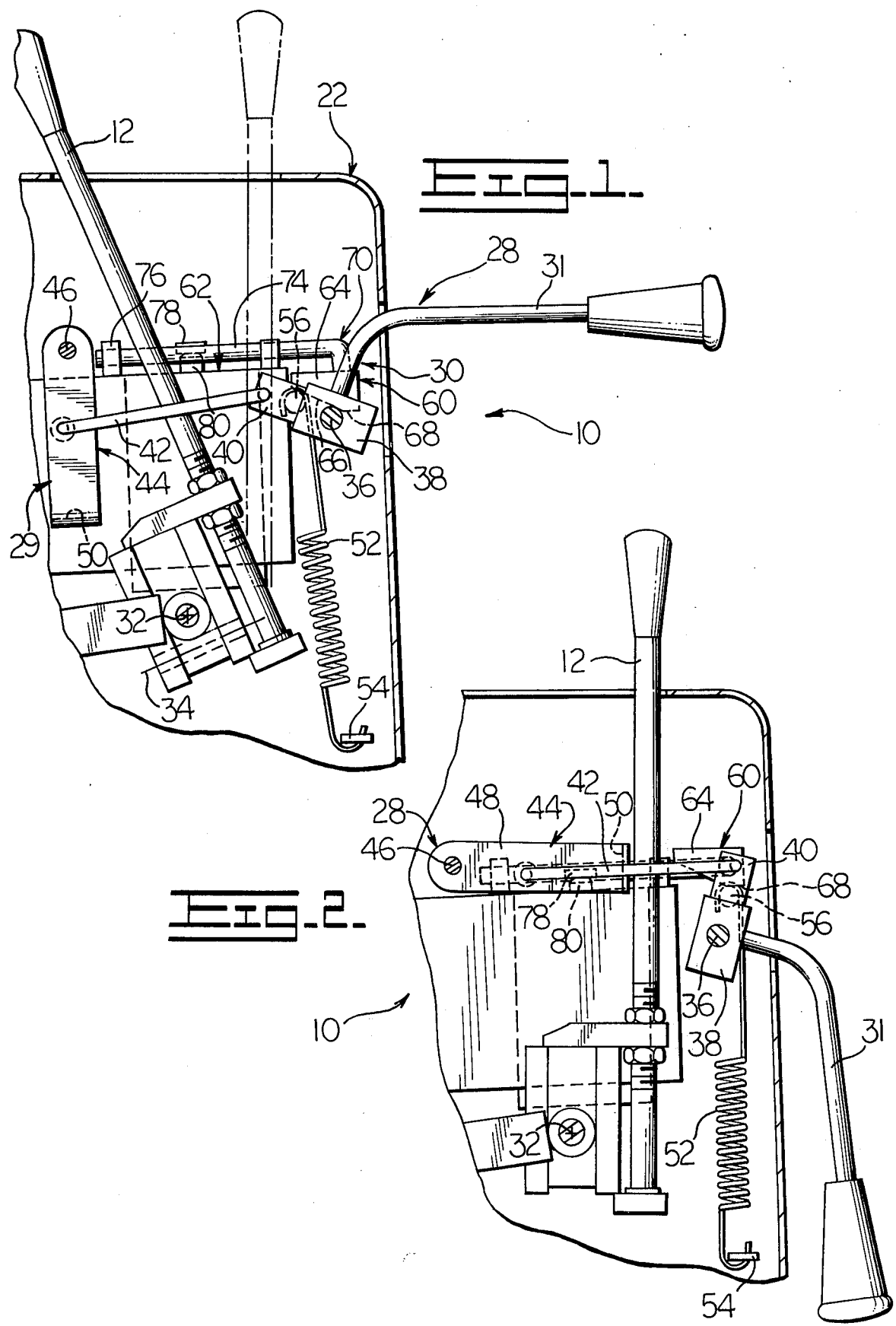

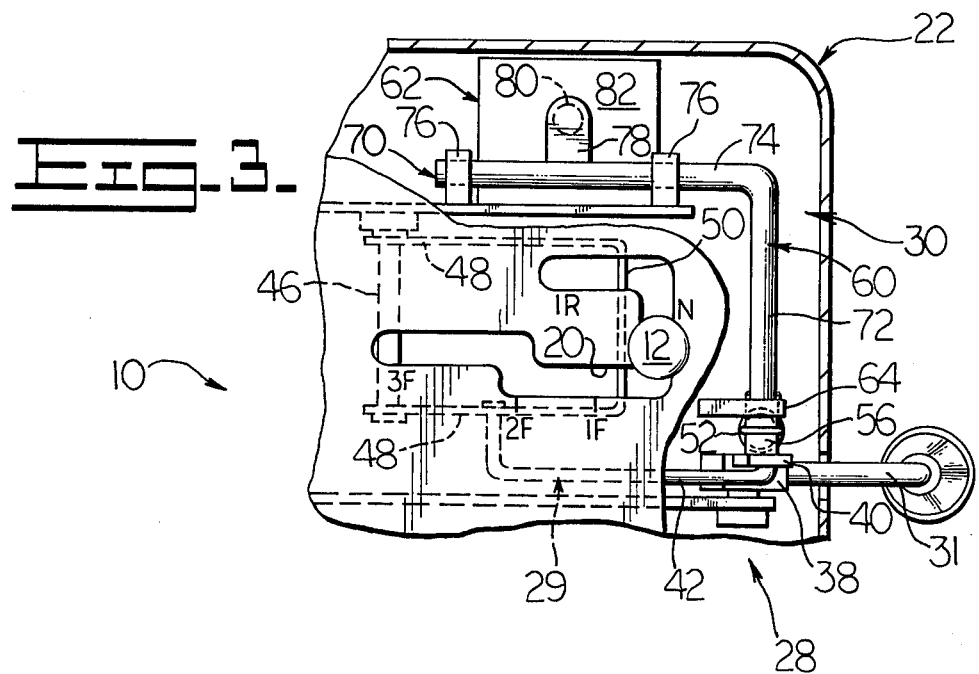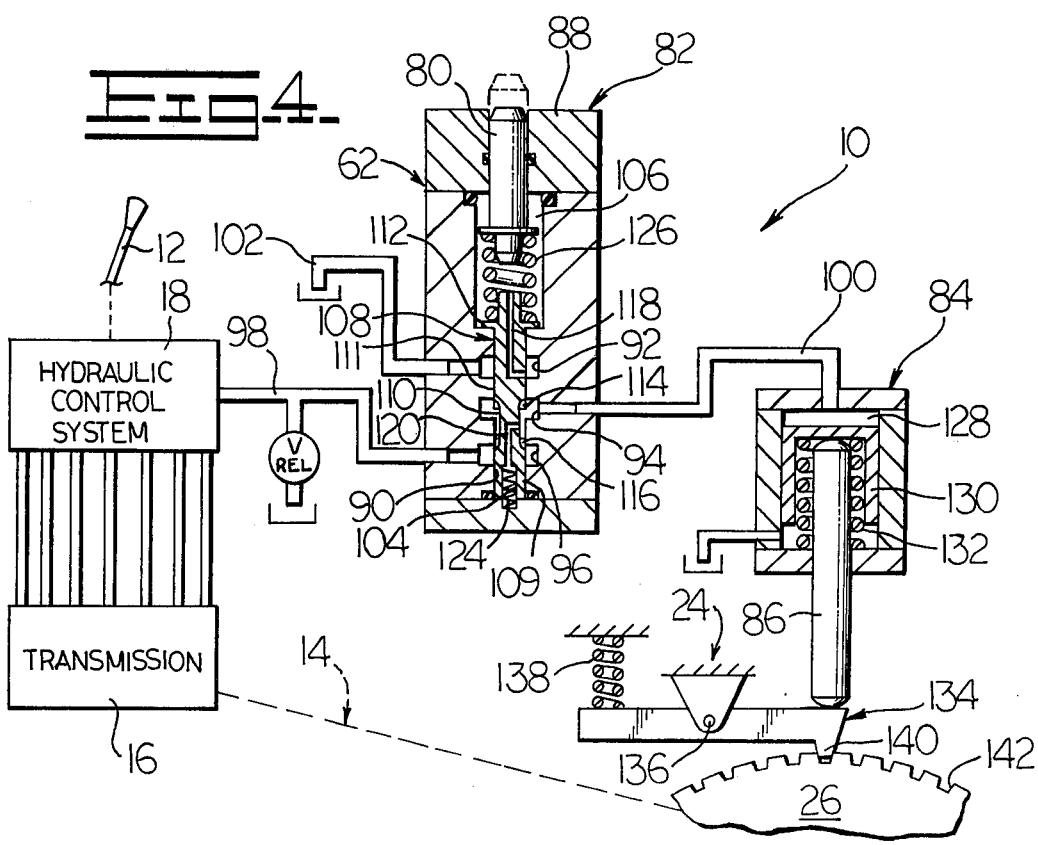

COMBINATION TRANSMISSION NEUTRALIZER AND POWER TRAIN INTERLOCK SYSTEM

BACKGROUND OF THE INVENTION

This invention relates to a combination transmission neutralizer and power train interlock system whereby inadvertent movement of the vehicle is prevented by selectively positioning an actuator mechanism into an operable position, and interrelates this action with appropriate transmission gear shift lever positioning.

Heretofore, interrelated power train interlock and transmission gear shift lever systems have been relatively complex and costly in construction. This is because such systems must assure that the transmission is placed in an inoperative or neutral position before applying the interlock, and must also prevent shifting of the transmission into gear when the interlock is applied. In other words, these systems must anticipate and/or prevent inadvertent operator misuse of the controls of the vehicle. Exemplifying the prior art in this area are the following U.S. Pat. Nos.:

2,653,689 issued Sept. 29, 1953 to W. A. Hasbany;
3,242,758 issued Mar. 29, 1966 to K. J. Harris et al.;
3,474,690 issued Oct. 28, 1969 to P. A. G. Lepelletier;
3,601,231 issued Aug. 24, 1971 to F. Koacz et al.;
3,621,956 issued Nov. 23, 1971 to D. S. Suckow et al.;
3,635,317 issued Jan. 18, 1972 to E. R. Crabb et al.;
3,710,904 issued Jan. 16, 1973 to R. G. Boyer et al.

Each of the aforementioned disclosures involves constructions physically tailored to a specific type of transmission gear shift lever, associated control system, and interlock arrangement. Moreover, it is further apparent that the operator may forget to apply the interlock in several of the above construction. For example, in most prior art arrangements only the gear shift lever itself is relatively inconspicuously involved in the selection of a parking mode. These and other disadvantages of the prior art systems, including the problem of adapting such arrangements to a remotely disposed interlock, have been overcome by the apparatus of the present invention.

SUMMARY AND OBJECTS OF THE INVENTION

Accordingly, it is an object of the present invention to provide a combination transmission neutralizer and power train interlock system, and including an easily operated mechanism which is actuatable to engage an interlock with the power train to positively prevent movement of the vehicle.

Another object of the invention is to provide a reliable system of the character described which will prevent inadvertent shifting of the transmission gear shift lever out of neutral and into gear until the interlock mechanism is released.

Other ojects and advantages of the present invention, including simplicity of construction and adaptability to a remotely disposed interlock, will become more readily apparent upon reference to the accompanying drawings and following description.

BRIEF DESCRIPTION OF THE DRAWINGS

FIG. 1 is a fragmentary and diagrammatic side elevational view of a portion of the interlock system of the present invention with the transmission gear shift lever shown in a gear position and with the actuating lever therefor in an inactive position blocking egress from the vehicle.

FIG. 2 is a side elevational view similar to FIG. 1 only showing the interlock system with the transmission gear shift lever in neutral and the actuating lever disposed in an active position corresponding to engagement of the interlock.

FIG. 3 is a diagrammatic top plan view of the interlock system shown in FIG. 2 with portions broken away to better illustrate details of construction thereof.

FIG. 4 is a fragmentary and diagrammatic view of another operatively associated portion of the interlock system of the present invention showing in section hydraulically actuated brake engaging device therefor, and including portions of a power train and a hydraulic control system which cooperate therewith.

DESCRIPTION OF THE PREFERRED EMBODIMENT

Referring to the drawings, there is shown a combination transmission neutralizer and power train interlock system 10 which is cooperatively associated with a transmission gear shift lever 12 of a vehicle such as a track-type tractor. As schematically illustrated in FIG. 4, the vehicle has a power train 14 including a conventional transmission 16 which is shifted by a hydraulic control system 18 operable through the manipulation of the gear shift lever. In the instant example, the gear shift lever is movable in a slot 20 of a control console 22 as shown in FIG. 3 from a forwardly disposed neutral (N) position at the right side of the drawing, to first (1F), second (2F), and third (3F) speed forward positions from an inner side thereof, or to a first speed reverse (1R) position from the outer side thereof.

When the tractor is stopped and parked, and with the gear shift lever in a neutral setting, it is desirable to brake the power train 14 in order to prevent movement of the tractor. As shown in FIG. 4, a normally disengaged interlock 24 is illustrated in its engaged position with respect to a rotatable output member or other conventional gear element 26 of the power train. Such interlock is simple and economical, and is adaptable for engagement with the gear element without the need for the additional componentry and spacing requirements associated with heavy duty disc or band type brakes. The present invention provides an improved system to operate this interlock and to obviate the foregoing difficulties as will be discussed further below.

In accordance with the present invention, the interlock system 10 includes an actuator mechanism 28 consisting basically of a gear shift lever moving and retaining apparatus 29 and an interlock engaging apparatus 30, operated by an actuating lever 31. This lever is selectively positionable between a raised, inactive position as shown in FIG. 1 and a lowered, active or operable position as shown in FIG. 2. While the gear shift lever 12 is universally mounted within the control console 22 for longitudinal rocking movement about a fixed transverse pivot joint or axis 32 and for transverse rocking movement about a movable longitudinally oriented pivot joint or axis 34, the actuating lever 31 is pivotally mounted within the console solely on a transverse pivot joint or axis 36. In connection with the construction of the gear shift lever adjacent its inner extremity, reference is made to U.S. Pat. No. 3,768,329, issued Oct. 30, 1973 to G. S. Comer, Jr. et al, and assigned to the assignee of the present invention. In general, however, such construction and associated apparatus serves to translate the circuitous movement of the gear shift lever within the slot 20 to a straight line motion for effective operation of the hydraulic control system 18, the output details of which are not important to the present invention.

More particularly, the gear shift lever mounting and retaining apparatus 29 is actuated by a body portion 38 on the inner end of the actuating lever 31 and a projection or arm 40 thereon which extends rearwardly therefrom or upwardly therefrom in accordance with the respective pivotal dispositions of the lever shown in FIGS. 1 and 2. A connecting link 42 is pivotally secured to the arm and to a rearwardly disposed U-shaped stop member 44 which is rockable within the console about a fixed transverse pivot joint or axis 46. It is clearly apparent from FIGS. 2 and 3 that the stop member, having a pair of parallel side legs 48 and a cross bar 50, is positionable in a substantially horizontal plane so that the cross bar abuts the rear of the gear shift lever 12 when the actuating lever 31 is in its active position. Consequently, in such disposition the gear shift lever moving and retaining apparatus prevents movement of the gear shift lever from neutral into one of its gear positions.

Due to an overcenter spring 52, mountably coupled to a fixed anchor point 54 and a laterally outwardly extending cylindrical pin or projection 56 intergrally secured to the arm 40, the actuating lever 31 and the stop member 44 have two stable spring loaded positions. In the first position, corresponding to FIG. 2, the spring acting forwardly of the pivot joint 36 serves to rotate the actuating lever 31 into a maximum clockwise position when viewing the drawing. In such instance the arm 40 is displaced forwardly to raise the cross bar 50 and hold it against the gear shift lever 12 as mentioned above. When, however, the actuating lever is raised to the second position illustrated in FIG. 1, the arm and pin are displaced rearwardly so that the spring acts in tension rearwardly of the pivot joint 36 and to thereby bias the actuating lever to its maximum counterclockwise position. In the latter instance the connecting link 42 is urged generally rearwardly so that the stop member 44 is rotated in a clockwise manner about the pivot joint 46. This locates the cross bar in a rearward position where it does not influence or interfere with any normal shifting of the gear shift lever.

In accordance with one aspect of the invention, the interlock engaging apparatus 30 includes a mechanical portion or motion translating device 60 directly coupled to the actuating lever 31 as shown best in FIGS. 1 and 3, and a hydraulically actuated portion or engaging device 62 as shown in FIG. 4, which is actuated by the motion translating device. Referring initially to the motion translating device, the pin 56 extends laterally outwardly to make continual engagement with a cam plate 64 thereof having a transitionally inclined bottom surface 66 and an interlock engaging surface 68. This plate is integrally secured to an L-shaped cylindrical rod member 70 having a forwardly disposed leg 72 and a laterally outwardly disposed leg 74 freely rotatably mounted on the control console by way of a pair of longitudinally spaced apart bearing blocks 76. A laterally outwardly projecting lug 78 is integrally spaced to the leg 74 intermediate the bearing blocks so that as the pin 56 is arcuately moved forwardly and upwardly, the lug is lowered to depress an input control plunger 80 associated with the engaging device 62.

As shown in FIG. 4, the hydraulically actuated engaging device 62 includes a two-position valve assembly 82 which is actuated by the control plunger 80, and a spring retracted load piston assembly 84 which may be overridden by the valve assembly to engage the interlock 24 through extension of an output rod 86. More specifically, the valve assembly 82 includes a housing 88 having a cylindrical bore 90 defined therein and an upper or drain annulus 92, a central annulus 94, and a lower or pressure annulus 96 arranged to open in series on the bore. The lower annulus is in continuous open communication with a source of fluid at a predetermined pressure in a conduit 98 leading to the hydraulic control system 18 of the transmission 16. For example, 21 Kg per sq. cm (300 psi) pressure is preferably available thereat. The central annulus is in continual communication with the load piston assembly by way of a conduit 100, and the upper annulus is always open to a drain conduit 102. A closed spring chamber 104 is disposed at the lower end of the bore, and an enlarged spring chamber 106 is arranged at its upper end.

More specifically, the valve assembly 82 includes a two-position valve spool 108 having a lower land 109, a centrally disposed reduced diameter neck 110, an upper land 111, and an upper spring seat 112 formed thereon. Also exteriorly formed in the upper and lower lands of the spool adjacent the neck are one or more drain slots 114 and one or more pressure admitting slots 116, respectively. Furthermore, an internal passage 118 formed in the spool continually serves to communicate the upper spring chamber 106 with the drain annulus 92, and another internal passage 120 formed therein communicates the lower spring chamber 104 with the chamber surrounding the neck. Moreover, a compression spring 124 is located in the spring chamber 104 to continually bias the spool upwardly, and a main compression spring 126 is located in the spring chamber 106 and mountably coupled between the input control plunger 80 and the spring seat of the spool to continuously urge the spool downwardly.

Thus, it is apparent that in the depressed and actuated condition of the plunger 80 shown in FIG. 4, the spring seat 112 of the spool 108 is forced into abutting engagement with the housing 88 by the loaded compression spring 126, and the pressure conduit 98 is communicated with the conduit 100 through the annulus 96, the pressure admitting slot 116, the neck 110, and the annulus 94. This is directed to an internal chamber 128 formed within the load piston assembly 84, and acts on a load piston 130 to urge it downwardly as viewed in the drawing against the loading of a piston retraction spring 132. Subsequently, the output rod 86 is also extended or urged downwardly by the load piston to act directly upon a parking lock member or pawl 134 of the interlock 24. As clearly illustrated, the pawl is centrally rockable on a stationary pivot joint 136, and a retraction spring 138 is engaged therewith to normally hold a tooth portion 140 of the pawl out of engagement with a corresponding tooth portion 142 of the drive train output member 26.

Operation

While the operation of the present invention is believed clearly apparent from the foregoing description, further amplification will subsequently be made in the following brief summary of such operation. It is to be recognized that the actuating lever 31 of the present invention is supported and arranged to extend horizontally and outwardly from the control console 22 in its inactive position as illustrated in FIG. 1, in which position it conspicuously tends to block the free egress of the operator from the tractor. Consequently, the operator is reminded that the lever should be repositioned to its single operable and fully lowered position as illustrated in FIG. 2 before he climbs off the tractor, whereupon the interlock 24 would be positively applied.

It is, of course, recognized from the above that the interlock 24 is disengaged whenever the actuating lever 31 is in its inactive or raised position. In FIG. 1, for example, the pin 56 on the actuating lever is in its lowered position so that the cam plate 64 is biased against it by the plunger 80 is also lowered. As a result, the motion translating device 60 including the rod member 70 is rocked to an orientation wherein the lug 78 is raised and the input control plunger 80 extends upwardly to an inactive position. As can be visualized with reference to FIG. 4, the upward disposition of the plunger will permit the lower spring 124 of the valve assembly 82 to bias the valve spool 108 upwardly to a position wherein the conduit 100 leading to the load piston assembly 84 is open to the drain conduit 102 via the annulus 94, the drain slot 114, and the annulus 92. With the chamber 128 thus being depressurized, the spring 132 serves to bias the load piston 130 upwardly to a retracted position and the spring 138 to bias the pawl 134 away from engagement with the output member 26. Consequently, the unimpeded transmission gear shift lever 12 can be positioned to operate the transmission 16 and power train 14 of the vehicle in any of its forward or reverse modes of operation in a normal manner.

In accordance with one aspect of the present invention, manual lowering of the actuating lever 31 from the FIG. 1 to the operable FIG. 2 position will simultaneously result in automatically displacing the gear shift lever 12 forwardly from any gear position to neutral, in the event that the tractor operator had inadvertently left it in such a position. As mentioned earlier, this is the result of the forward motion of the cross bar 50 of the stop member 44 which is operatively connected to the actuating lever through the arm 40 and the link 42. Moreover, in the FIG. 2 position of the cross bar, the gear shift lever is blocked from rearward movement into any gear, so that it is necessary to raise the actuating lever before the tractor can be moved.

Upon lowering the actuating lever 31, the pin 56 connected thereto is raised to position the cam plate 64 and the device 60 in a mode of operation wherein the plunger 80 is depressed. As best shown in FIG. 4, such movement urges the spool 108 downwardly through the increased loading of the spring 126 to the position illustrated, where the drain annulus 92 is cut off from the conduit 100 and the pressure annulus 96 is communicated to the load piston assembly 84. Thus, the source of pressure fluid advantageously acts within the chamber 128 and on the full area of the load piston 130 in a force mulitplying or boosting manner to extend it against the action of the spring 132. This causes the output rod 86 to extend and to positively engage the pawl 134 intimately and tightly against the tooth portion 142 of the output member 26.

While the invention has been described and shown with particular reference to a preferred embodiment, it will be apparent that variations might be possible that would fall within the scope of the present invention, which is not intended to be limited except as defined in the following claims.

What is claimed is:

1. A transmission neutralizer and power train interlock system associated with a vehicle power train having a transmission and a rotatable member, the system comprising:

a control console;
   a gear shift lever having projection thereon, said gear shift lever being movable on said control console between a plurality of gear positions and controlling said transmission, said gear positions including a neutral position;
   an actuator mechanism having an actuating lever movable between an inactive position at which the mechanism is positioned away from said gear shift lever and a locking position at which the mechanism retains said gear shift lever in said neutral position, said gear shift lever being moved to said neutral setting in response to movement of said actuating lever to said locking position;
   a normally disengaged interlock positioned adjacent said rotatable member;
   a fluid operated interlock engaging device having a valve assembly actuated by an input control plunger, a source of pressurized fluid to said valve assembly, a normally retracted load piston assembly in contact with said interlock, and a supply conduit connected between said valve assembly and said load piston assembly; and
   a mechanical motion translating device having a rod member and a cam surface on said rod member, said rod member being pivotally mounted on said control console and of a construction sufficient for moving said input control plunger in response to movement of said actuating lever to said locking position and corresponding movement of said projection against said cam surface, causing said valve assembly to direct pressure fluid from said source through said conduit to said load piston assembly, extending said load piston assembly, and engaging said interlock with said rotatable member of the power train.

* * * * *